United States Patent
Yang et al.

(10) Patent No.: US 11,897,815 B2
(45) Date of Patent: Feb. 13, 2024

(54) MG—TA BASED DIELECTRIC CERAMIC FOR MULTI-LAYER CERAMIC CAPACITOR AND LOW-TEMPERATURE PREPARATION METHOD THEREOF

(71) Applicant: Yangtze Delta Region Institute (Huzhou), University of Electronic Science and Technology of China, Huzhou (CN)

(72) Inventors: YuanYuan Yang, Huzhou (CN); XiaoZhen Li, Kunming (CN); MengJiang Xing, Kunming (CN); YanLing Luo, Wuxi (CN); HongYu Yang, Xi'an (CN); QingYang Fan, Xi'an (CN)

(73) Assignee: Yangtze Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 0 days.

(21) Appl. No.: 18/140,342

(22) Filed: Apr. 27, 2023

(65) Prior Publication Data
US 2023/0348332 A1 Nov. 2, 2023

(30) Foreign Application Priority Data
Apr. 29, 2022 (CN) .......................... 202210472764.5

(51) Int. Cl.
*C04B 35/495* (2006.01)
*C04B 35/626* (2006.01)
(Continued)

(52) U.S. Cl.
CPC ........ *C04B 35/495* (2013.01); *C04B 35/6262* (2013.01); *C04B 35/64* (2013.01);
(Continued)

(58) Field of Classification Search
CPC .................................................... C04B 35/495
See application file for complete search history.

(56) References Cited

FOREIGN PATENT DOCUMENTS

CN 107382313 A 11/2017
CN 114773060 A * 7/2022

OTHER PUBLICATIONS

CNIPA, Notification of a First Office Action for CN202210472764.5, dated Nov. 1, 2022.
(Continued)

*Primary Examiner* — Karl E Group
(74) *Attorney, Agent, or Firm* — Zhigang Ma

(57) ABSTRACT

A Mg—Ta based dielectric ceramic for multi-layer ceramic capacitor (MLCC) and a low-temperature preparation method thereof are provided. By providing a glass additive with high matching with a Mg—Ta ceramic, a modifier $A^{+1}_2CO_3$—$B^{2+}O$—$C^{3+}_2O_3$—$SiO_2$ (A=Li, K; B=MnO, CuO, BaO; C=B, Al) is intruded in to a main material MgO—$Ta_2O_5$, which can significantly reduce the sintering temperature and provide a negative temperature coefficient of dielectric constant of $-100\pm30$ ppm/° C., and reduce the deterioration factors of loss caused by an additive for sintering, and prepare a dielectric material applied to RF MLCC with low loss, low cost and good process stability.

1 Claim, 1 Drawing Sheet

(51) Int. Cl.
    *C04B 35/64*          (2006.01)
    *C04B 35/653*       (2006.01)
    *H01G 4/12*          (2006.01)

(52) U.S. Cl.
    CPC ......... *C04B 35/653* (2013.01); *H01G 4/1227* (2013.01); *C04B 2235/3206* (2013.01); *C04B 2235/3215* (2013.01); *C04B 2235/3217* (2013.01); *C04B 2235/3255* (2013.01); *C04B 2235/3262* (2013.01); *C04B 2235/3281* (2013.01); *C04B 2235/3409* (2013.01); *C04B 2235/3418* (2013.01); *C04B 2235/442* (2013.01); *C04B 2235/6562* (2013.01); *C04B 2235/6567* (2013.01); *C04B 2235/76* (2013.01)

(56) References Cited

OTHER PUBLICATIONS

University of Electronic Science and Technology of China (Applicant), Reply to Notification of a First Office Action for CN202210472764.5, w/ replacement claims, dated Jan. 10, 2023.
University of Electronic Science and Technology of China (Applicant), Supplemental Reply to Notification of a First Office Action for CN202210472764.5, w/ (allowed) replacement claims, dated Feb. 2, 2023.
CNIPA, Notification to grant patent right for invention in CN202210472764.5, dated Mar. 1, 2023.

* cited by examiner

ABSTRACT PAGE / COLUMN TEXT:

MG—TA BASED DIELECTRIC CERAMIC FOR MULTI-LAYER CERAMIC CAPACITOR AND LOW-TEMPERATURE PREPARATION METHOD THEREOF

TECHNICAL FIELD

The disclosure relates to the field of electronic ceramics and manufacture thereof, and more particularly to a magnesium-tantalum (Mg—Ta) based dielectric ceramic for multi-layer ceramic capacitor for multi-layer ceramic capacitor (MLCC) and a low-temperature preparation method thereof.

BACKGROUND

With the rapid development of mobile communication, miniaturization and integration of microelectronic devices have become the mainstream. The MLCC plays an irreplaceable role in military, electronic information, mobile communication, aerospace and other fields because of its advantages such as large capacity, small volume and suitability for mass production. Especially driven by the 5-th generation (5G) technology, the requirements for the MLCC will grow steadily in the future. The MLCC includes three parts: an internal electrode, a terminal electrode and a ceramic medium, in which the internal electrode (such as silver (Ag), Ag/platinum (Pt)) and the ceramic medium are parallel to each other to form a main body, and the terminal electrode generally has a three-layer structure: an innermost layer is Ag or Ag—Pt, which plays a link role and leads out the internal electrode; a middle layer is a blocking layer, usually is nickel (Ni) or Cuprum (Cu), which mainly prevents Ag from being corroded by molten solder during welding; and an outermost layer is a welding layer. The classification of ceramic capacitors is often expressed by a temperature coefficient $\tau_\varepsilon$ of a dielectric constant of the used dielectric ceramic. According to the RS-198 standard of electronic industry association (EIA) in the United Stated of America (U.S.A) (EIA RS-198), the dielectric ceramics can usually be divided into three classes according to their temperature stability, the class I ceramic, the class II ceramic and the class III ceramic. Specifically, the class I ceramic capacitors have high stability and low loss, the class II ceramic capacitors have high volumetric efficiency but poor stability, and are suitable for buffering, decoupling and bypassing circuits, the class III ceramic capacitors have higher volumetric efficiency but poorer stability. Due to high stability and low loss, Class I ceramic capacitors are most widely used in radio frequency (RF) and microwave communication. Naming rules vary according to the EIA RS-198. For example, ceramic capacitors with M2G temperature characteristics refer to a temperature drift of −100±30 ppm/° C. in a temperature range of −55° C. to 85° C., which can be used to prepare transmitter and receiver (T/R) components of phased-array radars, RF power amplifiers, transmitters and other circuits for coupling, coordination and filtering.

A traditional dielectric material for the MLCC is based on $TiO_2$, and a sintering temperature, dielectric properties, and a temperature coefficient of a dielectric constant are adjusted by ion substitution or composite doping. For example, in a barium-titanium (Ba—Ti) system, $BaTiO_3$ is the earliest representative of the Class II ceramic capacitors for commercial application, while $BaTi_4O_9$ is a typical reprehensive of the Class I ceramic capacitors. A Mg—Ti system, represented by $MgTiO_3$ with excellent dielectric properties, is a potential low-loss dielectric material in radio frequency communication, but its further practical application is limited due to the high sintering temperature (greater than 1400° C.).

A Mg—Ta based dielectric ceramic is a kind of material with a moderate dielectric constant and an extremely low dielectric loss (such as $MgTa_2O_6$: $\varepsilon_r$ is 25, Q×f is 131000 GHz, and tan δ is $7\times10^{-5}$), which is potential dielectric material for the class I ceramic capacitors. However, the sintering temperature of this ceramic is too high (greater than 1400° C.), although some researchers have tried to reduce the sintering temperature, for example, when 0.5 wt. % $B_2O_3$ is added, a sintering temperature of $MgO—Ta_2O_5$ ceramic is 1550° C. ($\varepsilon_r$ is 27.8, Q×f is 180000 GHz); When 0.4 wt. % MgO is added, the sintering temperature of $MgO—Ta_2O_5$ ceramic is still high at 1425° C. ($\varepsilon_r$ is 25.3, Q×f is 160000 GHz); when a sol-gel method is used, the powder is uniform at nanometer level, and the sintering temperature is moderate (1200° C.) but the dielectric loss is increased ($\varepsilon_r$ is 30.1, Q×f is 57300 GHz), and the sol-gel method is complex and not suitable for mass production; and when 5 wt. % CuO is added, the sintering temperature is obviously improved (as low as 1100° C.), but the Q×f value is obviously deteriorated (as low as 21200 GHz).

Based on the above research status, it is not difficult to find that the $MgTa_2O_6$-based ceramic in the related art cannot maintain excellent dielectric properties at a lower sintering temperature. Therefore, it is necessary to, according to the application requirements of RF ceramic capacitors with current M2G temperature characteristics, develop a temperature-compensated RF MLCC material with simple and controllable process, low dielectric loss, co-firing with an Ag70/Pd30 internal electrode (1080° C. to 1150° C.) and a stable temperature coefficient of dielectric constant, to meet the application requirements of an RF communication industry.

SUMMARY

The purpose of the disclosure is to provide a Mg—Ta based dielectric ceramic for multi-layer ceramic capacitor and a low-temperature preparation method thereof, thereby to overcome the technical problems of the $MgTa_2O_6$-based ceramic that cannot balance the low sintering temperature and the excellent dielectric properties.

In order to achieve the above purpose, the disclosure adopts the following technical solutions.

A Mg—Ta based dielectric ceramic for multi-layer ceramic capacitor is provided, which including a ceramic material and a modifier;
  a chemical formula of the ceramic material is $MgTa_2O_6$;
  a formula of the modifier is $A^{+1}_2CO_3—B^{2+}O—C^{3+}_2O_3—SiO_2$ with a mass ratio of 31:17:36:16 (wt. %), $A^{+1}_2CO_3$ consists of 20 wt. % of $Li_2CO_3$ and 11 wt. % of $K_2CO_3$; $B^{2+}O—$ consists of 2 wt. % BaO, 5 wt. % of MnO and 10 wt. % of CuO; and $C^{3+}_2O_3$ consists of 30 wt. % of $B_2O_3$ and 6 wt. % of $Al_2O_3$;
  where a formula of the Mg—Ta based dielectric ceramic is $MgTa_2O_6$+x wt. % of the modifier, a value of x of the modifier is in a range of 1 to 2, the Mg—Ta based dielectric ceramic is prepared by a solid-state method, a main crystal phase of the Mg—Ta based dielectric ceramic is $MgTa_2O_6$ phase with a Trirutile structure, a sintering temperature of the Mg—Ta based dielectric ceramic is in a range of 1050° C. to 1150° C., a dielectric constant of the Mg—Ta based dielectric ceramic is in a range of 20 to 28, a dielectric loss of the Mg—Ta based dielectric ceramic is in a range of $1.7 \times 10^{-4}$ to $5.0 \times 10^{-4}$, a value of a quality factor Q×f is in a range of 16000 GHz to 45000 GHz, and a temperature coefficient of the dielectric constant is stable and meets M2G temperature characteristics (−55° C.: −118 (parts per million)ppm/degree Celsius (° C.); 85° C.: −110 ppm/° C.).

In an embodiment, in a situation that the value of x is 2, under the sintering temperature of 1150° C., the dielectric constant of the Mg—Ta based dielectric ceramic is 26.87, the dielectric loss is $1.71 \times 10^{-4}$, and the value of the quality factor Q×f is 44398 GHz.

A method for preparing the above preparing the Mg—Ta based dielectric ceramic for multi-layer ceramic capacitor is provided, which includes the following steps:

step 1, mixing raw powders of magnesium oxide (MgO) and $Ta_2O_5$ according to the chemical formula $MgTa_2O_6$ to obtain a mixed powder;

step 2, putting the mixed powder prepared in step 1 into a ball milling tank, using zirconium balls and deionized water as a grinding medium and performing planet ball milling for 4-6 hours according to a mass ratio of the mixed powder:the zirconium balls:the deionized water of 1:4-5:2-4 to obtain a mixed slurry, drying the mixed slurry in an oven after the planet ball milling and then sieving with a 60-100 mesh sieve to obtain a sieved powder; and sintering the sieved powder in an atmosphere of 900-1000° C. for 3-5 hours to obtain $MgTa_2O_6$;

step 3, mixing raw powders of $Li_2CO_3$, $K_2CO_3$, BaO, MnO, CuO, $B_2O_3$, $Al_2O_3$, and $SiO_2$ according a mass ratio of $Li_2CO_3$:$K_2CO_3$:BaO:MnO:CuO:$Al_2O_3$:$SiO_2$ of 20:11:2:5:10:30:6:16 to obtain a second mixed powder; using the zirconium balls and alcohol as a grinding medium and performing planet ball milling for 6-8 hours according to a mass ratio of the second mixed powder:the zirconium balls:the alcohol of 1:4-5:4-6 to obtain a ball-milled material, sintering the ball-milled material at a temperature of 600-650° C. for 3-6 hours after drying the ball-milled material and then heating to a temperature of 1450-1550° C. for melting for 3-5 hours to obtain a melted material, pouring the melted material into the deionized water for cooling to obtain a cooled material, and grinding the cooled material to a uniform power as the modifier;

step 4, mixing the modifier prepared in step 3 into $MgTa_2O_6$ prepared in step 2 according to the formula of the Mg—Ta based dielectric ceramic $MgTa_2O_6$+x wt. % to obtain a third mixed power, x is in a range of 1 to 2, performing planetary ball milling for 3-5 hours according to a mass ratio of the third mixed powder:the zirconium balls:the deionized water of 1:4-5:3-5 to obtain a second ball-milled material, and adding a polyvinyl alcohol solution, as a binder, into the second ball-milled material after drying the second ball-milled material to perform granulation to obtain a ceramic raw material; and step 5: performing press-molding on the ceramic raw material prepared in step 4, heating at a heating rate of 2-5° C./min and discharging glue at 600-650° C. for 3-5 hours, and then heating at the same heating rate to a temperature of 1050-1150° C. and keeping the temperature for 4-6 hours, thereby obtaining a modified $MgTa_2O_6$ dielectric ceramic material.

In the field of low-temperature sintered ceramics, the driving force of low-temperature sintering comes from the matching relationship between a glass additive (also referred as to modifier) and a ceramic, that is, the glass additive produces a liquid phase when a temperature is above a melting point. If they have good matching, a ceramic powder can be wetted in the liquid phase, which leads to dissolution and completes a mass transfer mechanism of "dissolution-precipitation" to realize low-temperature densification. However, the matching between the glass additive and the ceramic is unique, so in the disclosure, a modifier $A^{+1}_2CO_3$—$B^{2+}O$—$C^{3+}_2O_3$—$SiO_2$ (A=Li, K; B=MnO, CuO, BaO; C=B, Al) is intruded in to the main material MgO—$Ta_2O_5$, which can significantly reduce the sintering temperature and provide a negative temperature coefficient of dielectric constant of −100±30 ppm/° C., and reduce the deterioration factors of loss caused by an additive for sintering, and prepare a dielectric material applied to RF MLCC with low loss, low cost and good process stability.

DETAILED DESCRIPTION OF EMBODIMENTS

The disclosure will be further described in detail with the attached drawings and embodiments.

A method for preparing a Mg—Ta based dielectric ceramic for multi-layer ceramic capacitor is provided and includes the following steps: step 1, mixing raw powders of magnesium oxide (MgO) and $Ta_2O_5$ according to the chemical formula $MgTa_2O_6$ to obtain a mixed powder;

step 2, putting the mixed powder prepared in step 1 into a ball milling tank, using zirconium balls and deionized water as a grinding medium and performing planet ball milling for 6 hours according to a mass ratio of the mixed powder:the zirconium balls:the deionized water of 1:5:4 to obtain a mixed slurry, drying the mixed slurry in an oven after the planet ball milling and then sieving with a 100 mesh sieve to obtain a sieved powder; and sintering the sieved powder in an atmosphere of 1000° C. for 5 hours to obtain $MgTa_2O_6$;

step 3, mixing raw powders of $Li_2CO_3$, $K_2CO_3$, BaO, MnO, CuO, $B_2O_3$, $Al_2O_3$, and $SiO_2$ according a mass ratio of $Li_2CO_3$:$K_2CO_3$:BaO:MnO:CuO:$B_2O_3$:$Al_2O_3$:$SiO_2$ of 20:11:2:5:10:30:6:16 to obtain a second mixed powder; using the zirconium balls and alcohol as a grinding medium and performing planet ball milling for 6 hours according to a mass ratio of the second mixed powder:the zirconium balls:the alcohol of 1:5:4 to obtain a ball-milled material, sintering the ball-milled material at a temperature of 600° C. for 5 hours after drying the ball-milled material and then heating to a temperature of 1500° C. for melting for 4 hours to obtain a melted material, pouring the melted material into the deionized water for cooling to obtain a cooled material, and grinding the cooled material to a uniform power as the modifier;

step 4, mixing the modifier (also referred to as glass additive) prepared in step 3 into $MgTa_2O_6$ (also preferred to as pre-fired material) prepared in step 2 according to the formula of the Mg—Ta based dielectric ceramic $MgTa_2O_6$+x wt. % to obtain a third mixed power, x is 1 or 2, performing planetary ball milling for 5 hours according to a mass ratio of the third mixed powder:the zirconium balls:the deionized water of 1:5:4 to obtain a second ball-milled material, and adding an 8 wt. % of polyvinyl alcohol solution, as a binder, into the second ball-milled material after drying the second ball-milled material to perform granulation to obtain a ceramic raw material; and step 5: performing press-molding on the ceramic raw material prepared in step 4, heating at a heating rate of 5° C./min and discharging glue at 650° C. for 4 hours, and then heating at the same heating rate to a temperature of 1050-1150° C. and keeping the temperature for 6 hours, thereby obtaining a modified $MgTa_2O_6$ dielectric ceramic material.

Figure 1:
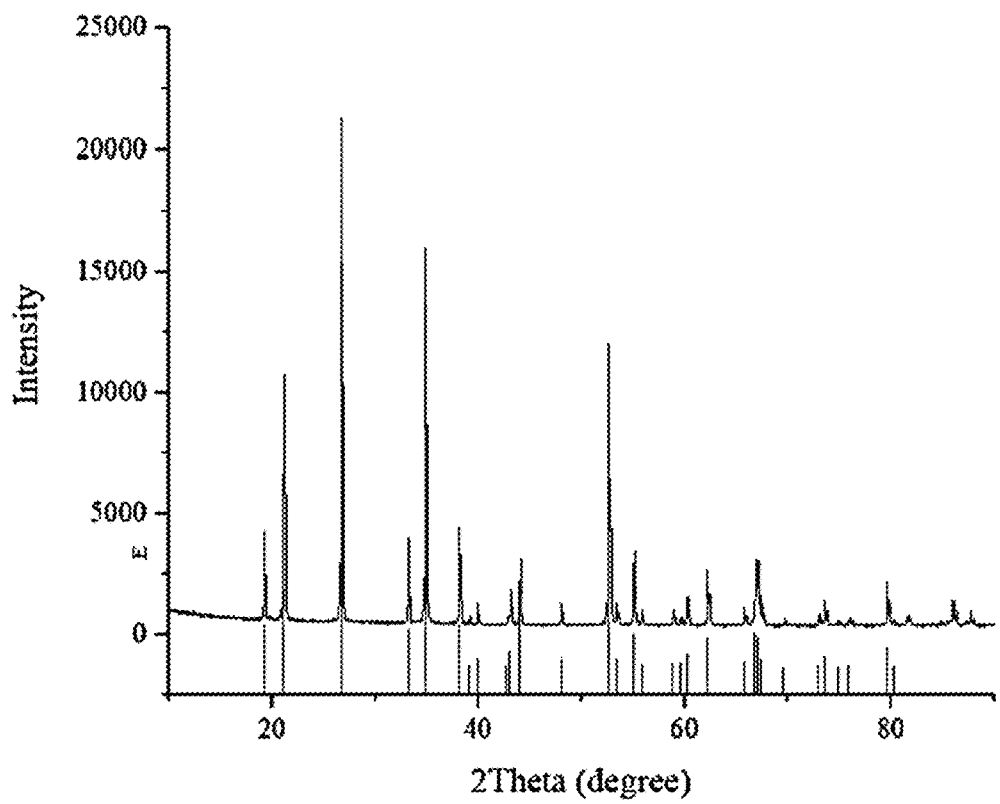
FIG. 1 illustrates a schematic diagram of an X-ray diffraction (XRD) pattern according to an embodiment 6 of the disclosure.

In order to better illustrate the effect of the disclosure, six embodiment samples are made according to the above steps. FIG. 1 is the XRD pattern of an embodiment 6. After searching, the phase composition of the ceramic corresponds to the standard card of $MgTa_2O_6$, i.e. joint committee on powder diffraction standards (JCPDS) card with No. 32-0631, no second phase diffraction peak is found in the system at this time, which indicates that ion substitution will not change the crystal structure at this doping amount, and this type of ceramic belongs to the $MgTa_2O_6$ structure.

Figure 2:
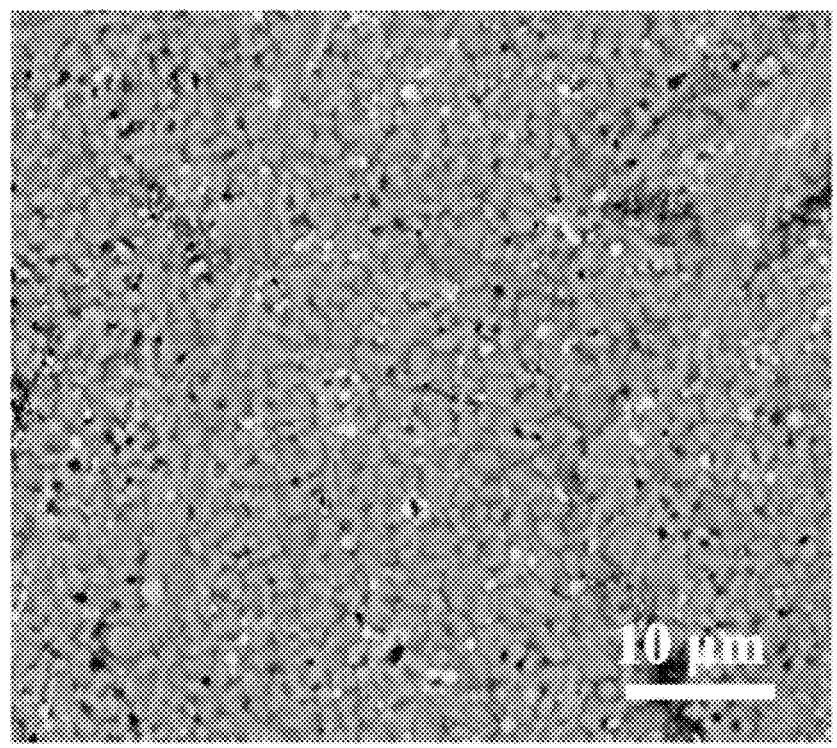
FIG. 2 illustrates a schematic diagram of scanning electron microscope (SEM) according to the embodiment 6 of the disclosure.

FIG. 2 is a SEM topography diagram of the embodiment 6. As can be seen from FIG. 2, the grain size is small, and there are fewer pores.

The composition and microwave dielectric properties of the embodiments are shown in Table 1 and Table 2 as follows.

Table 1 shows the components of each embodiment sample.

|  |  | Embodiment number | | | | | |
|---|---|---|---|---|---|---|---|
|  |  | 1 | 2 | 3 | 4 | 5 | 6 |
| Mass of each component | MgO | 8.358 | 8.358 | 8.358 | 8.358 | 8.358 | 8.358 |
|  | $Ta_2O_5$ | 91.642 | 91.642 | 91.642 | 91.642 | 91.642 | 91.642 |
|  | $Li_2CO_3$ | 0.200 | 0.200 | 0.200 | 0.400 | 0.400 | 0.400 |
|  | $K_2CO_3$ | 0.110 | 0.110 | 0.110 | 0.220 | 0.220 | 0.220 |
|  | BaO | 0.020 | 0.020 | 0.020 | 0.040 | 0.040 | 0.040 |
|  | MnO | 0.050 | 0.050 | 0.050 | 0.100 | 0.100 | 0.100 |
|  | CuO | 0.100 | 0.100 | 0.100 | 0.200 | 0.200 | 0.200 |
|  | $B_2O_3$ | 0.300 | 0.300 | 0.300 | 0.600 | 0.600 | 0.600 |
|  | $Al_2O_3$ | 0.060 | 0.060 | 0.060 | 0.120 | 0.120 | 0.120 |
|  | $SiO_2$ | 0.160 | 0.160 | 0.160 | 0.320 | 0.320 | 0.320 |
| Sintering temperature (° C.) |  | 1050 | 1100 | 1150 | 1050 | 1100 | 1150 |

Table 2 shows the dielectric properties of each embodiment sample.

| Embodiment number | dielectric constant $\varepsilon_r$ | tan$\delta$ ($10^{-4}$) | Q × f (GHz) | $\tau_\varepsilon$ (ppm/° C.) | |
|---|---|---|---|---|---|
|  |  |  |  | −55° C. | 85° C. |
| 1 | 21.33 | 3.09 | 25793 | −94 | −98 |
| 2 | 24.69 | 2.25 | 33956 | −107 | −115 |
| 3 | 27.81 | 1.88 | 40521 | −114 | −105 |
| 4 | 20.38 | 4.89 | 16587 | −80 | −88 |
| 5 | 25.17 | 1.82 | 42665 | −103 | −112 |
| 6 | 26.87 | 1.71 | 44398 | −118 | −110 |

From the data shown in Table 1 and Table 2, it can be seen that in the embodiment 6, when the sintering temperature is 1150° C., the dielectric constant and Q×f value of the modified $MgTa_2O_6$ dielectric ceramic material get the best values: $\varepsilon_r$=26.87, tan $\delta$=1.71×$10^{-4}$, Q×f=44398 GHz, and $\tau_\varepsilon$ is in a range of −118 ppm/° C. to −110 ppm/° C. Compared with literature reports in the related art, the sintering temperature is greatly reduced and the dielectric loss is kept low, at the same time, the temperature coefficient of dielectric constant is relatively stable in the range of −55° C. to 85° C., the modified dielectric ceramic material is suitable for industrial application.

What is claimed is:

1. A magnesium-tantalum (Mg—Ta) based dielectric ceramic for multi-layer ceramic capacitor, comprising a ceramic material and a modifier;
    wherein a chemical formula of the ceramic material is $MgTa_2O_6$;
    a formula of the modifier is $A_2CO_3$—BO—$C_2O_3$—$SiO_2$ with a mass ratio of 31:17:36:16, $A_2CO_3$ consists of 20 wt. % of $Li_2CO_3$ and 11 wt. % of $K_2CO_3$; BO consists of 2 wt. % BaO, 5 wt. % of MnO and 10 wt. % of CuO; and $C_2O_3$ consists of 30 wt. % of $B_2O_3$ and 6 wt. % of $Al_2O_3$;
    a formula of the Mg—Ta based dielectric ceramic is $MgTa_2O_6$+2 wt. % of the modifier, the Mg—Ta based dielectric ceramic is prepared by a solid-state method, a main crystal phase of the Mg—Ta based dielectric ceramic is $MgTa_2O_6$ phase with a Trirutile structure; under a sintering temperature of 1150 degrees Celsius (° C.), a dielectric constant of the Mg—Ta based dielectric ceramic is 26.87, a dielectric loss of the Mg—Ta based dielectric ceramic is 1.71×$10^{-4}$, and a value of a quality factor Q×f of the Mg—Ta based dielectric ceramic is 44398 GHz; and a temperature coefficient $\tau_\varepsilon$ of the dielectric constant is stable and meets M2G temperature characteristics of (−55° C.: $\tau_\varepsilon$=−118 parts per million (ppm)/° C.; 85° C.: $\tau_\varepsilon$=−110 ppm/° C.);
    the Mg—Ta based dielectric ceramic for multi-layer ceramic capacitor is prepared through the following steps:
    step 1, mixing raw powders of magnesium oxide (MgO) and $Ta_2O_5$ according to the chemical formula $MgTa_2O_6$ to obtain a mixed powder;
    step 2, putting the mixed powder prepared in step 1 into a ball milling tank, using zirconium balls and deionized water as a grinding medium and performing planet ball milling for 4-6 hours according to a mass ratio of the mixed powder:the zirconium balls:the deionized water of 1:4-5:2-4 to obtain a mixed slurry, drying the mixed slurry in an oven after the planet ball milling and then sieving with a 60-100 mesh sieve to obtain a sieved powder; and sintering the sieved powder in an atmosphere of 900-1000° C. for 3-5 hours to obtain $MgTa_2O_6$;

step 3, mixing raw powders of $Li_2CO_3$, $K_2CO_3$, BaO, MnO, CuO, $B_2O_3$, $Al_2O_3$, and $SiO_2$ according a mass ratio of $Li_2CO_3$:$K_2CO_3$:BaO:MnO:CuO:$B_2O_3$:$Al_2O_3$:$SiO_2$ of 20:11:2:5:10:30:6:16 to obtain a second mixed powder; using the zirconium balls and alcohol as a grinding medium and performing planet ball milling for 6-8 hours according to a mass ratio of the second mixed powder:the zirconium balls:the alcohol of 1:4-5:4-6 to obtain a ball-milled material, sintering the ball-milled material at a temperature of 600-650° C. for 3-6 hours after drying the ball-milled material and then heating to a temperature of 1450-1550° C. for melting for 3-5 hours to obtain a melted material, pouring the melted material into the deionized water for cooling to obtain a cooled material, and grinding the cooled material to a uniform power as the modifier;

step 4, mixing the modifier prepared in step 3 into $MgTa_2O_6$ prepared in step 2 according to the formula of the Mg—Ta based dielectric ceramic $MgTa_2O_6$+2 wt. % to obtain a third mixed power, performing planetary ball milling for 3-5 hours according to a mass ratio of the third mixed powder:the zirconium balls:the deionized water of 1:4-5:3-5 to obtain a second ball-milled material, and adding a polyvinyl alcohol solution, as a binder, into the second ball-milled material after drying the second ball-milled material to perform granulation to obtain a granular material; and step 5: performing press-molding on the granular material prepared in step 4, heating at a heating rate of 2-5° C./minutes (min) and discharging glue at 600-650° C. for 3-5 hours, and then heating at the same heating rate to a temperature of 1150° C. and keeping the temperature for 4-6 hours, thereby obtaining a modified $MgTa_2O_6$ dielectric ceramic material.

* * * * *